United States Patent
Pratt (10) Patent No.: US 9,623,780 B2
(45) Date of Patent: Apr. 18, 2017

(54) SUSPENSION ASSEMBLY FOR MULTI-POSITION RAMP

(71) Applicant: William Pratt, Belleair Beach, FL (US)

(72) Inventor: William Pratt, Belleair Beach, FL (US)

(*) Notice: Subject to any disclaimer, the term of this patent is extended or adjusted under 35 U.S.C. 154(b) by 90 days.

(21) Appl. No.: 14/706,493

(22) Filed: May 7, 2015

(65) Prior Publication Data

US 2016/0325667 A1  Nov. 10, 2016

(51) Int. Cl.
*B60P 1/43* (2006.01)
*B62D 53/06* (2006.01)
*B60P 3/10* (2006.01)
*B60P 1/02* (2006.01)

(52) U.S. Cl.
CPC ............... *B60P 1/433* (2013.01); *B60P 1/02* (2013.01); *B60P 3/1033* (2013.01); *B62D 53/062* (2013.01); *B60G 2202/152* (2013.01); *B60G 2300/04* (2013.01)

(58) Field of Classification Search
CPC .......... B60P 1/433; B60P 3/1033; B60P 1/02; B60G 2202/152; B60G 2300/04; B62D 53/062
See application file for complete search history.

(56) References Cited

U.S. PATENT DOCUMENTS

| 2,753,064 | A | * | 7/1956 | Lesser | B60P 1/04 |
| | | | | | 280/149.2 |
| 4,305,694 | A | * | 12/1981 | Chan | B60P 1/433 |
| | | | | | 293/117 |
| 4,372,727 | A | * | 2/1983 | Fredrickson | B60P 1/433 |
| | | | | | 296/61 |
| 5,044,865 | A | * | 9/1991 | Baer | B60P 3/122 |
| | | | | | 280/124.17 |
| 8,267,410 | B1 | | 9/2012 | Stutz et al. | |

* cited by examiner

*Primary Examiner* — Faye M Fleming
(74) *Attorney, Agent, or Firm* — Greer, Burns & Crain, Ltd.

(57) ABSTRACT

A suspension assembly includes an axle pivoting plate mounted to the frame at a first pivot point and rotationally fixed to the axle. Also included is a connection arm having a first end onto which the wheel is mounted and a second end for rotationally fixing the axle to the connection arm. An actuator is pivotally connected to the frame at a second pivot point, and is pivotally connected to the axle pivoting plate at a third pivot point. The first pivot point, the second pivot point and the third pivot point are all located below the lower surface of the side rail. When the actuator is extended, the axle pivoting plate pivots about the first pivot point causing the axle and connection arm to swing rearwardly and rotate, causing the wheel to move vertically with respect to the frame to displace the trailer to a lowered position.

19 Claims, 9 Drawing Sheets

SUSPENSION ASSEMBLY FOR MULTI-POSITION RAMP

FIELD OF THE INVENTION

Embodiments described herein relate generally to vehicles having multi-position suspension assemblies, and more particularly, to a trailer having a suspension assembly that actuates to displace a ramp between a raised position and a lowered position.

BACKGROUND

Trailers are commonly used for transporting cargo. One disadvantage of existing trailers is that most are equipped with a suspension system having an axle that is rigidly attached to the underbody of the trailer, preventing the upward and downward mobility of the trailer. Some trailers are equipped with a ramp to assist with loading and unloading cargo, but typically these ramps are separate components that are either attached to the trailer or are hinged to the rear edge of the trailer. In both configurations, the ramp takes up space on the trailer when the ramp is stowed. Additionally, since the ramps are typically manufactured to be robust to withstand heaving loading conditions, both the hinged ramps and the attached ramps are heavy and difficult to maneuver from the stowed position to the deployed position.

U.S. Pat. No. 8,267,410 to Stutz et al. discloses a trailer having a ramp that is pivotable between a lowered position and a raised position. The suspension assembly has an axle that is pivotally connected to the vehicle, and an actuation device is pivotally connected to the axle. The actuation device is moveable between its extended and retracted lengths, which results in the trailer being lowered or raised from the ground. However, there are several drawbacks of the invention of U.S. Pat. No. 8,267,410, including that a component of the suspension assembly pivots about the side rails of the trailer and protrudes vertically above the bed of the trailer. This configuration can interfere with placement of cargo on the bed of the trailer. Further, the suspension mechanism has a number of plates that cooperate with each other, which causes an increase in the overall width of the trailer (in the direction transverse to the direction of travel).

SUMMARY

A suspension assembly for attachment to a trailer having a frame, a side rail, an axle and a wheel includes an axle pivoting plate pivotally mounted to the frame at a first pivot point and rotationally fixed to the axle. Also included is a connection arm having a first end onto which the wheel is rotatably mounted and a second end for receiving and rotationally fixing the axle to the connection arm. An actuator is movable between an extended and a retracted position. The actuator is pivotally connected to the frame at a second pivot point, and is pivotally connected to the axle pivoting plate at a third pivot point. The first pivot point, the second pivot point and the third pivot point are all located below the lower surface of the side rail. When the actuator is extended, the axle pivoting plate pivots about the first pivot point causing the axle and connection arm to swing rearwardly and rotate, causing the wheel to move substantially vertically with respect to the frame to displace the trailer from a raised to a lowered position.

A vehicle suspension assembly for attachment to a frame of a trailer having a side rail, an axle, a bed and an underbody, includes a wheel rotatively mounted on a connection arm, the connection arm extending from the center of the wheel and being fixed to the axle. The connection arm is indirectly pivotally connected to the frame at a first pivot point. The connection arm and the wheel are located on the outboard side of the frame. An axle pivoting plate is fixed to the axle. The axle pivoting plate is located on the inboard side of the frame and is pivotally connected to the frame at the first pivot point. The axle pivoting plate and the connection arm pivot together about the first pivot point through their respective fixed relationships to the axle. An actuator is movable between an extended and a retracted position. The actuator is pivotally connected to the frame at a second pivot point, and the actuator is pivotally connected to the axle pivoting plate at a third pivot point. The actuator is located on the inboard side of the frame. When the actuator is extended, the axle pivoting plate pivots the axle about the first pivot point, and the suspension assembly located on the inboard side of the frame that pivots about the first pivot point only pivots within the underbody so as not to protrude above the bed.

A vehicle suspension assembly for attachment to a frame of a trailer having a first axle and a second axle includes first and second wheels associated with the first axle and the second axle, respectively. The first and second wheels each have an axle pivoting plate that is fixed to the first and second axles, respectively, and that is pivotally connected to a respective primary pivot point. A first actuator and a second actuator are each movable between an extended and a retracted position, the first and second actuators being pivotally connected to the frame at respective secondary pivot points. The first and second actuators are pivotally connected to their respective axle pivoting plates at a tertiary pivot point. When the first and second actuators are extended, the first and second axle pivoting plates pivot the first and second axles, respectively, about the respective primary pivot points, and pivots the first and second axles about the respective centers of the first and second wheels to displace the trailer from a raised position to a lowered position.

DETAILED DESCRIPTION OF THE PREFERRED EMBODIMENTS

Referring to FIGS. 1-4A, a suspension assembly 10 for a vehicle, such as a trailer 12, is configured to raise and lower a rearmost portion 14 of the trailer to provide an inclined ramp surface 16 for facilitating the loading and unloading of cargo. The trailer 12 has a frame 18 that preferably includes a pair of longitudinally extending side rails 20, 22, which are generally parallel to each other and span at least a portion of the length of a trailer. The distance between the exterior surfaces of the side rails 20, 22 generally forms the transverse width of the frame 18. The side rails 20, 22 may be joined together by one or more cross members 24, which transversely span the frame 18 from the inboard surface of the side rail 20 to the inboard surface of the opposite side rail 22. The term "inboard" refers to the interior of the trailer 12 located between the side rails 20, 22, while the term "outboard" refers to the exterior of the trailer 12 located to the exterior of the side rails.

Figure 1:
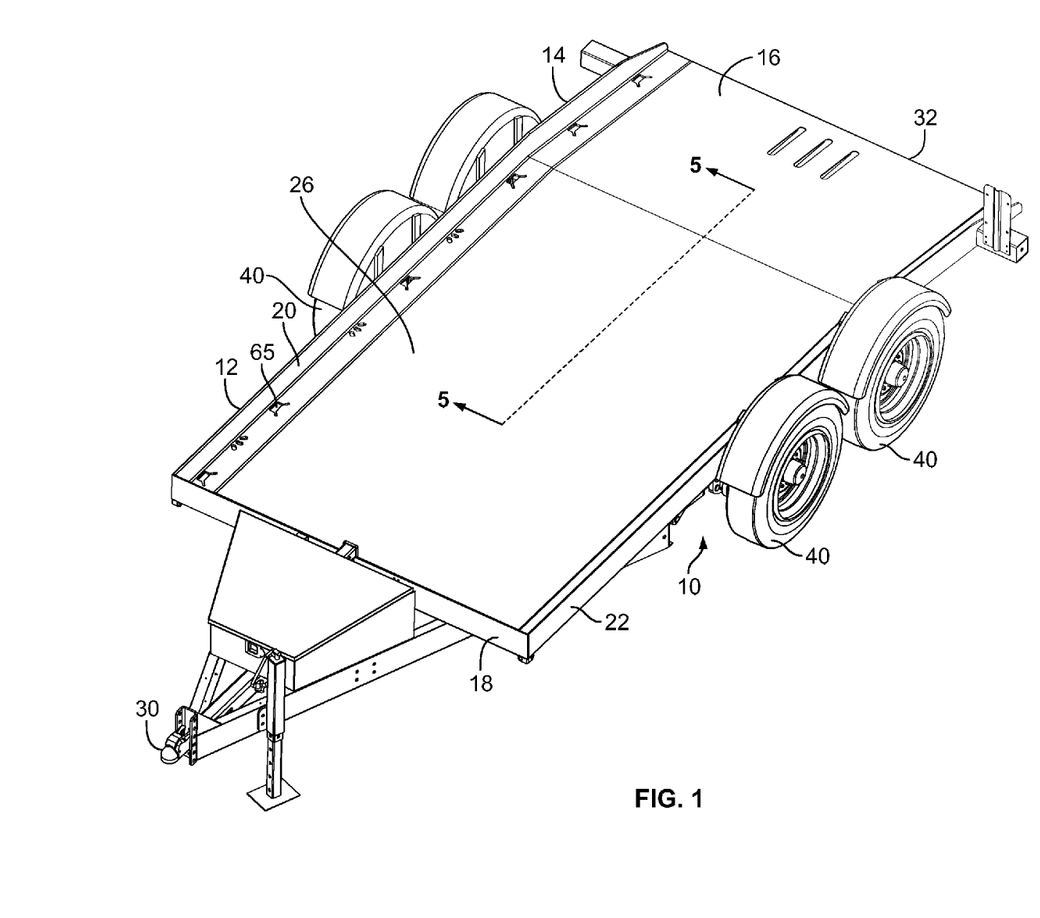
FIG. 1 is a top and side perspective view of a trailer having a double-axle configuration.

A bed 26 generally forms a planar upper surface of the trailer 12 for receiving cargo (not shown), and an underbody 28 of the trailer is opposite of the bed. As seen in FIG. 1, the bed 26 of the trailer 12 is generally flat, planar and continuous between the two side rails 20, 22 and is devoid of upwardly extending protrusions. A leading edge 30 of the trailer 12 may attach to a towing vehicle (not shown), and a rear edge 32 is opposite the leading edge and defines the longitudinal length of the trailer. The trailer 12 can have various widths and lengths, and may be open or enclosed.

Figure 2:
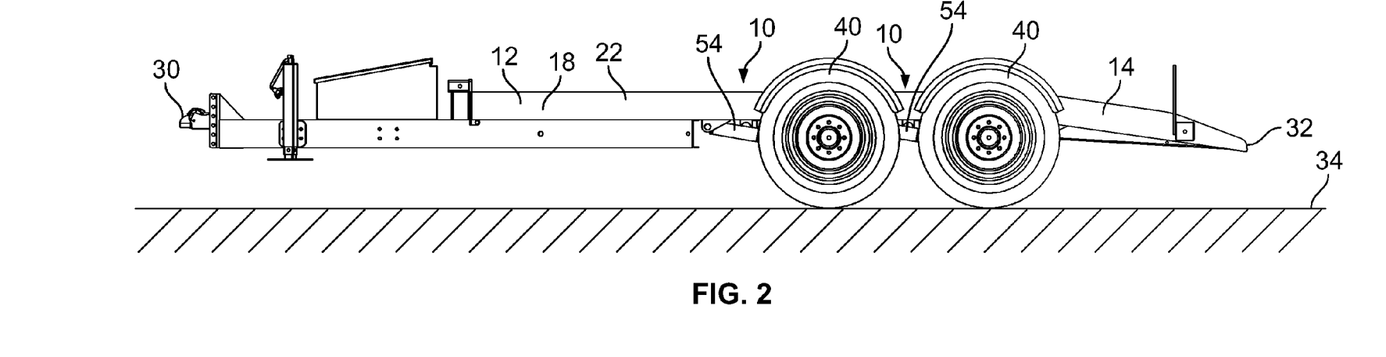
FIG. 2 is a side view of the trailer shown in FIG. 1 in a raised position.
Figure 3:
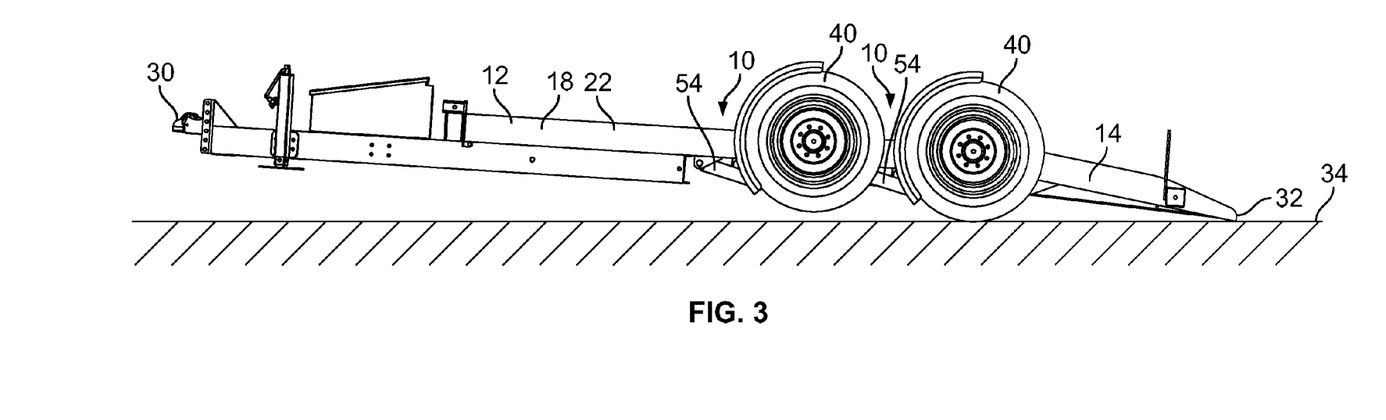
FIG. 3 is a side view of the trailer shown in FIG. 1 in a lowered position.

As will be detailed below, the rear edge 32 is configured to be lowered towards the ground 34. As seen in FIG. 2, the rearmost portion 14 of the trailer 12 may be generally parallel with the forward portion of the bed 26 as seen in elevation view, or may have a slight downward grade with respect to the forward portion of the bed. In both configurations, the rearmost portion 14 of the trailer is generally parallel with the ground 34 when it is in the raised position. As seen in FIG. 3, the trailer 12 is shown in a lowered position such that the trailer 12 forms an angle with the ground 34. It is possible that the rearmost portion 14 of the trailer 12 contacts the ground 34, or it is possible that the rearmost portion extends towards the ground without contacting the ground.

Referring now to FIG. 4A-6, the suspension assembly 10 is mounted on the underbody 28 of the frame 18 of the trailer 12. The suspension assembly 10 has a first axle 36 and a second axle 38, although additional axles are contemplated. Each axle 36, 38 has at least one wheel 40 on each of the transverse sides of the trailer 12 corresponding to the exterior side of the first side rail 20 and the exterior side of the second side rail 22.

While it is preferred that each wheel 40 has an associated suspension assembly 10, it is possible that there is only a single suspension assembly 10 associated with each axle, or a single suspension assembly for multiple wheels associated with each axle at each side rail 20, 22. Further, it is possible that more than one suspension assembly 10 is associated with each axle on each side. The description herein will refer to the suspension assemblies 10, 10' associated with the axles 36, 38, where each axle has a single wheel 40 at a side rail 20, 22. However, it should be understood that the various arrangements of suspension assemblies associated with the axles 36, 38 are contemplated.

Each axle 36, 38 is fixedly attached to a connection arm 42, preferably by transversely receiving the non-cylindrical axle in a corresponding receiving structure in the plate, where the respective shapes of the axle and receiving structure prevent relative rotation between the axle and the connection arm, such as in a press fit. The connection arms 42 may be welded to the respective axle 36, 38. The connection arm 42 is generally elongate and is pivotally connected to the center of the corresponding wheel 40, such that the wheel 40 is free to rotate. The connection arm 42 and the wheel 40 are located on the outboard side of the frame 18. Since the connection arm 42 is located on the outboard side of the frame 18, a relatively thin and high-tensile strength material is used to keep the width of the trailer to a minimum. A radial distance R1 is formed between the center of the wheel 40 and the axle 36, 38, as measured along the length direction of the connection arm 42. In this configuration, the axles 36, 38 are offset with respect to the wheel center by the distance R1. When the trailer 12 is in the raised position, the connection arm 42 is generally parallel to the ground and to the frame 18.

An axle mounting plate 44 is fixed to the frame 18 and pivotally connects the axle 36, 38 to the frame at pivot point 46 through an axle pivoting plate 48. It is also possible that the axle mounting plate 44 is integrally formed with the frame 18 or that the pivot point 46 is directly on the frame 18. The term "pivot point" will be used herein to describe a point about which components pivot, which preferably includes a pin connection at the pivot point, however other configurations for pivoting components are contemplated. The center-to-center distance between the axle 36, 38 and the pivot point 46 is a distance D1, and the radial distance between the center of the wheel 40 and the pivot point 46 is a radial distance R2, where R2 is less than R1. The axle mounting plate 44 is preferably mounted on a lower surface of the frame 18 at the rails 20, 22, and more preferably, the pivot point 46 is preferably located beneath the lower surface of the rails.

While the axle pivoting plate 48 is pinned at pivot point 46, the axle pivoting plate is also fixedly attached to each axle 36, 38 at the inboard side of the trailer 12. To be fixed to the axle 36, 38, the axle pivoting plate 48 may have a receiving structure in the plate for transversely receiving the axle, where the receiving structure is configured such that it prevents relative rotation between the axle and the axle pivoting plate, and the axle pivoting plate 48 may be welded to the axle. As seen in the detail view of FIG. 4B, the axle pivoting plate 48 is preferably a multi-plated assembly, having a first sub-plate 50 and a second sub-plate 52 in a generally parallel and spaced relationship. In the preferred suspension assembly 10, the first sub-plate 50 is pinned at pivot point 46.

An actuator 54, such as a dual-acting hydraulic cylinder, has a first end 56 that is pivotally attached to the frame 18 with a pivot point 58 at an attachment plate 60. Preferably, the actuator 54 is mounted at an inboard side of the frame 18. At a second end 62, the actuator 54 is pivotally attached to the axle pivoting plate 48 at pivot point 64. The second end 62 of the actuator 54 is preferably received between the sub-plate 50 and the sub-plate 52, with the pivot point 64 fixing the sub-plates for rotational movement together. It is the rotation of the axle pivoting plate 48 that pivots the axle 36, 38 about the pivot point 46. The radial distance between the center of the wheel 40 and the pivot point 64 is R3, where R3>R1>R2. When the rearmost portion 14 of the trailer 12 is in the raised position, and the side rails 20, 22 are generally parallel to the ground 34. Further, when the rearmost portion 14 of the trailer 12 is in the raised position, the center of the wheel 40, the axle 36, 38 and the pivot point 64 generally define a line that is generally parallel to the ground.

Figure 5:
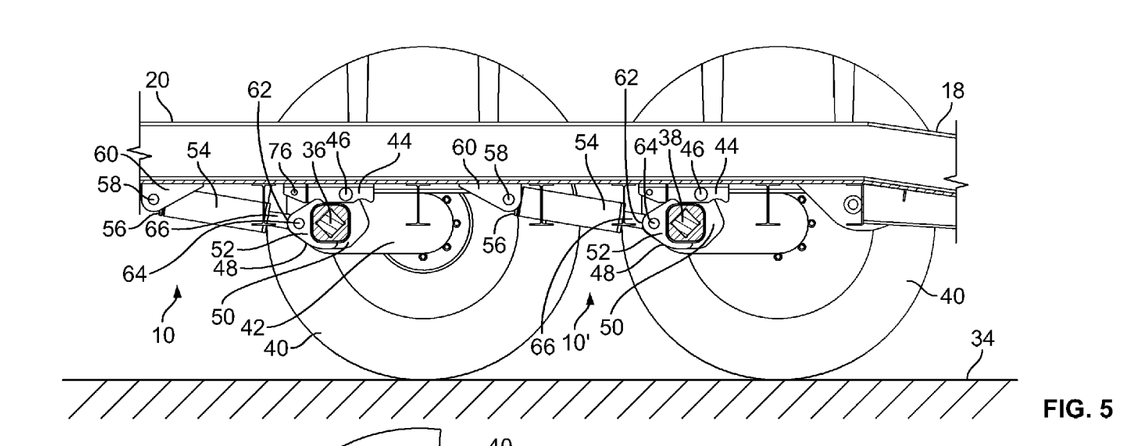
FIG. 5 is a cut-away section view of the suspension assembly taken along line 5-5 in FIG. 1 showing the assembly in a first position corresponding to the trailer in the raised position.
Figure 6:
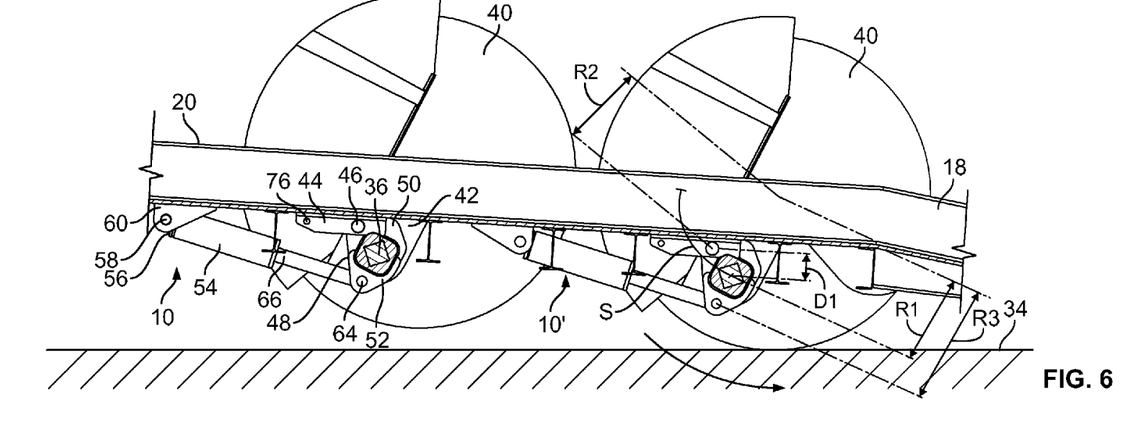
FIG. 6 is a cut-away section view of the suspension assembly taken along line 5-5 in FIG. 1 showing the assembly in a second position corresponding to the trailer in the lowered position.
Figure 7:
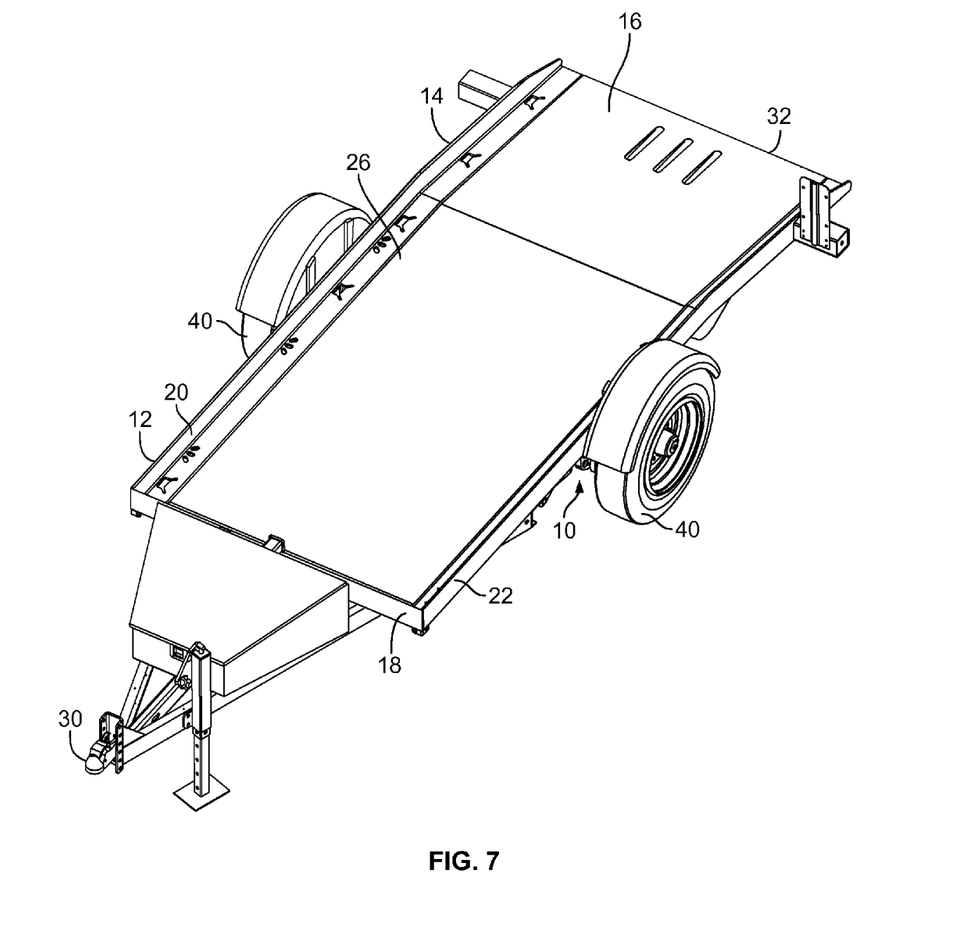
FIG. 7 is a top and side perspective view of a trailer having a single-axle configuration.

An arm 66 of the actuator 54 is displaceable between a retracted position shown in FIG. 5 and an extended position shown in FIG. 6. As the arm 66 is extended, the first end 56 pivots about pivot point 58, the second end 62 pivots about pivot point 64, and axle pivoting plate 48 pivots about pivot point 46. In the preferred suspension assembly 10, the sub-plate 50 directly pivots about pivot point 46, which pivots the entire axle pivoting plate assembly 48. The axle pivoting plate 48 pivots about the pivot point 46, causing the axle 36, 38 and connection arm 42 to swing rearwardly and rotate. The pivoting of axle pivoting plate 48 in turn causes the axles 36, 38 to pivot about pivot point 64 and to rotate the axles about the center of the wheel 40 (in the direction indicated in FIGS. 5 and 6). When the axles 36, 38 are pivoted about pivot point 46 in the direction indicated in FIG. 6 (and thus pivoted about the frame 18), the connection arm 42 is also indirectly pivoted about pivot point 46 due to the fixed relationship with the axle. When the connection arm 42 pivots with the axle 36, 38, the wheel 40 rotates, the wheel moves substantially vertically with respect to the frame 18, and the frame displaces towards the ground 34 from a raised position to a lowered position to form an inclined ramp surface 16 from the leading edge 30 to the rear edge 32.

The suspension assembly 10 components that are located on the inboard side of the side rail 20, 22 and that pivot about pivot point 46, only pivot within the underbody so as not to protrude above the bed 26. As can be seen in FIG. 1, the bed is preferably substantially clear of any protrusions between the side rails 20, 22, and more preferably, is entirely clear of any protrusions between the side rails 20, 22, such that the bed defines a planar surface between the side rails. In this configuration, the bed 26 is free of protrusions that can interfere with the placement of cargo on the bed. As further seen in FIG. 1, slots 65 are formed in the bed 26 of the trailer, and are preferably formed at the side rails 20, 22 or along at least a portion of the periphery of the trailer 12. The slots 65 allow the securement of cargo to the trailer 12.

With the suspension assembly 10 shown in FIGS. 5 and 6, each suspension assembly 10 and 10' rotates axles 36, 38 generally simultaneously over the same arc length S about the center of the wheels 40 and at the same rate. In this configuration, both wheels 40 contact the ground 34 in the raised position, and only the rear wheels contact the ground in the lowered position. If trailer 12 is level and hooked to the vehicle, the front axle will raise during actuation. If the frame 18 is slightly flexed, then the front tire 40 may touch the ground during actuation. One advantage of the suspension assembly 10 is that, during maintenance, such as to change a tire, when the trailer 12 is hooked to a vehicle, a block can be placed under the rear axle, and when the axles are rotated, then the wheel lifts off the ground to facilitate changing of the tire.

It is also possible that each sub-assembly 10, 10' rotates the forward wheels and the rear wheels at different times, over different arc lengths, and at different lengths, among other configurations.

When the trailer 12 is being driven, the actuator 54 is in a retracted position shown in FIG. 5. With the pivot point 46 located a radial distance forward of the center of the wheel 40 (in the longitudinal direction towards the leading edge 30 of the trailer 12), the forces imparted on the wheels 40 would tend to rotate the wheels in a counterclockwise direction as indicated in FIG. 5. However, the actuator 54 counters these forces to prevent the rotation.

Figures 4A, 4B:
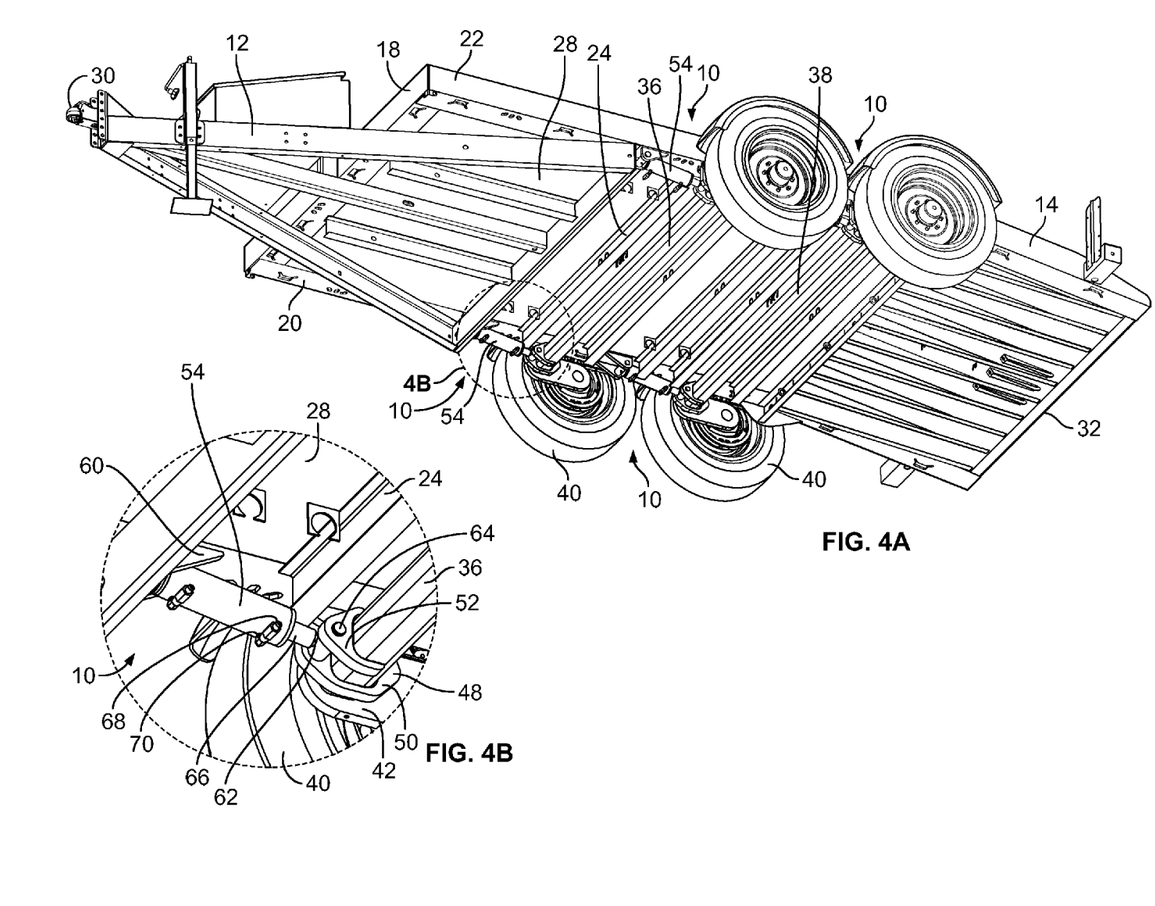
FIG. 4A is a perspective view of the trailer shown in FIG. 1 showing the underbody and suspension assembly.
FIG. 4B is a detail view of an actuator of the suspension assembly shown in FIG. 4A.

As seen in FIG. 4B, the actuator has an in-line velocity fuse 68 located at each port 70 that allows the arm 66 of the actuator 54 to hold its position in the event that there is a disruption in the hydraulics, such as a loss of fluid. While velocity fuses are known and used in other vehicle applications, the velocity fuse 68 of the present suspension assembly 10 is used to close-out the hydraulic line to prevent rotation of the axles 36, 38 in the event of a disruption in the hydraulics.

Figure 4C:
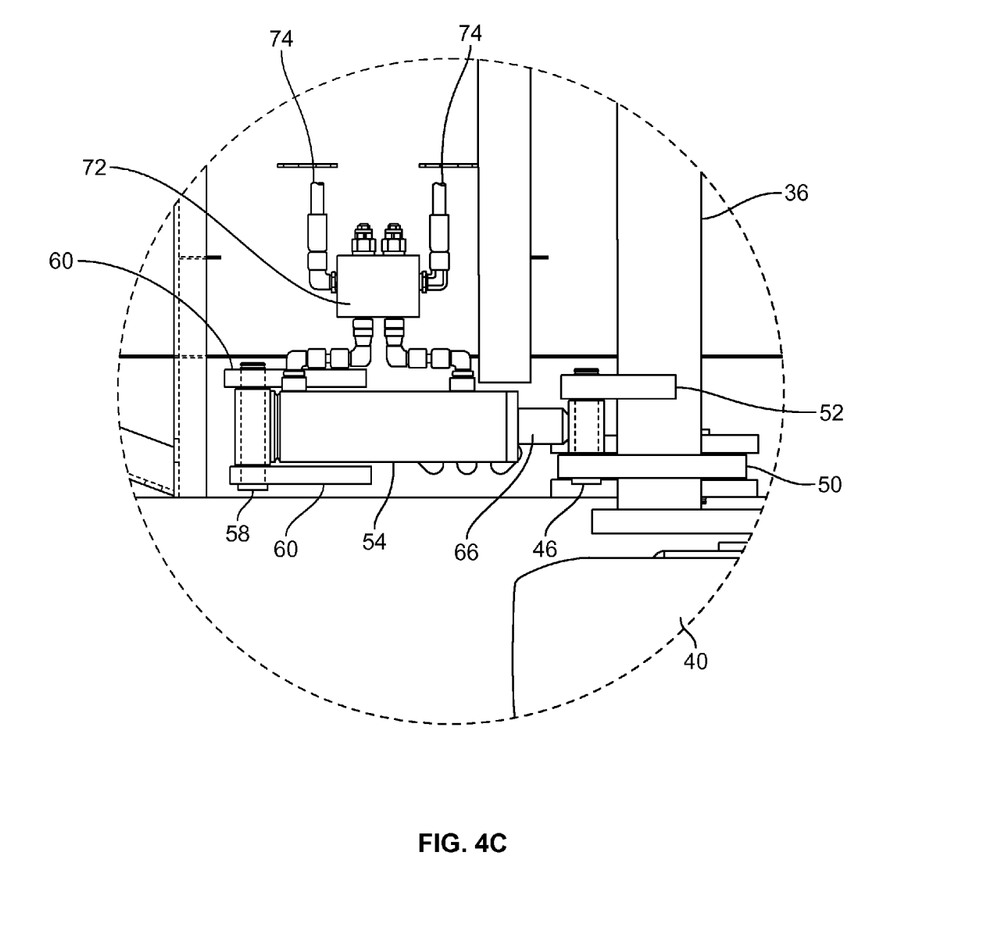
FIG. 4C is a detail view of the actuator of the suspension assembly shown in FIG. 4A with a rotation disablement device.

As shown in FIG. 4C, another feature of the present suspension assembly 10 is a rotation disablement device 72, such as a counterbalance valve or an electrically powered hydraulic switch, which prevents rotation of the axles 36, 38 and stabilizes the trailer 12 while it is in the travel or raised position. The rotation disablement device 72 has hydraulic supply and return lines 74. In the event that there is a slow leak in the hydraulic system, the rotation disablement device 72 stops the flow of fluid and locks the actuator in the compressed position, which prevents the rotation of the axles 36, 38.

Figure 4D:
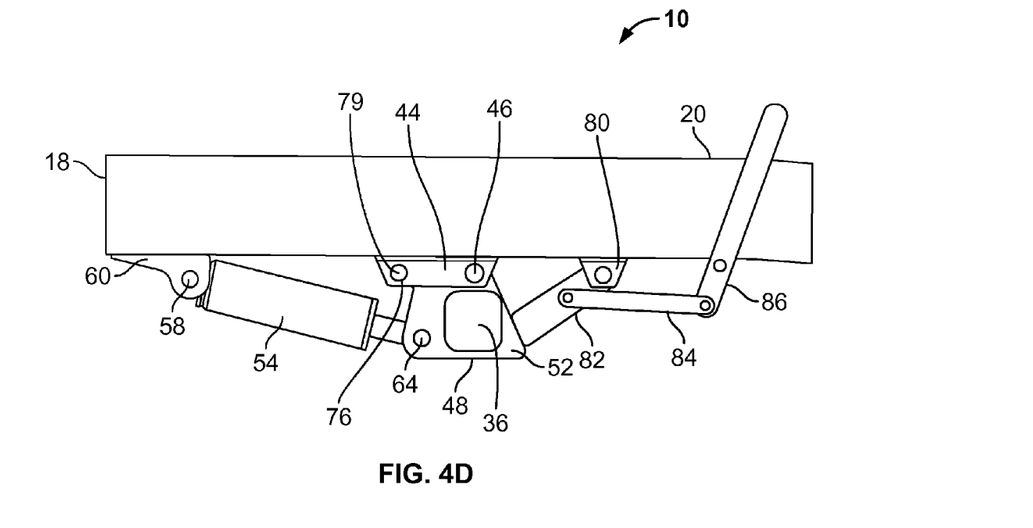
FIG. 4D is a detail view of the suspension assembly having a locking mechanism shown in the locked position.
Figure 4E:
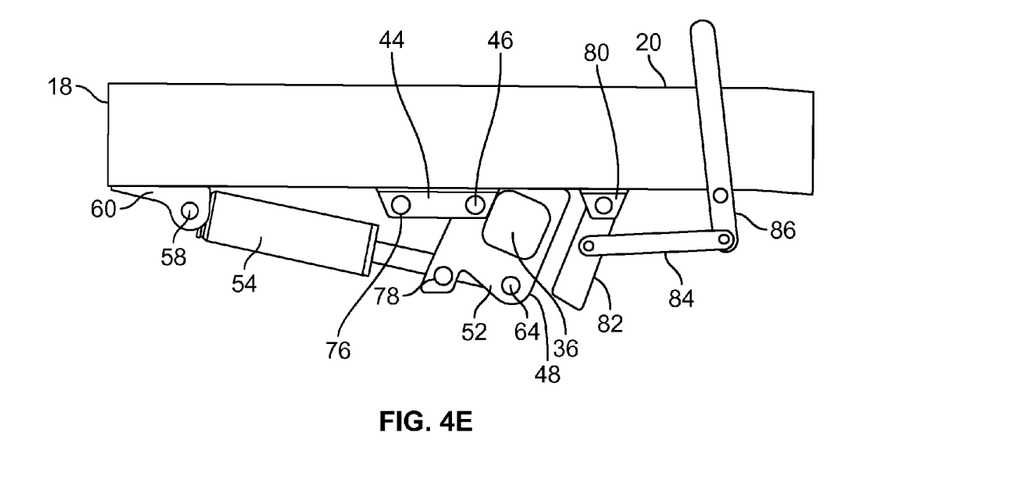
FIG. 4E is a detail view of the suspension assembly having a locking mechanism shown in the unlocked position.

Referring to FIGS. 4D and 4E, optional locking mechanisms are shown. A first access hole 76 may be disposed through the axle mounting plate 44 and a second access hole may be disposed through the axle pivoting plate 48, preferably at sub-plate 52. It is possible that the first access hole 76 is disposed directly through the frame 18. When the first access hole 76 and the second access hole 78 are aligned such as in FIG. 4D, they are configured to receive a lock pin 79 for fixing the relative location of the suspension assembly 10 to the frame 18, thereby preventing the rotation of the axle 36, 38. Additionally, a lug 80 may be attached to the frame 18, such as by welding the lug to the side rail 20, 22. A lock bar 82 may be pivotally attached to the lug 80 at the proximal end of the lock bar, and the distal end of the lock bar may be configured to engage the suspension assembly 10 at the axle pivoting plate 48. When engaged at its distal end, the lock bar 82 prevents rotation of the axle pivoting plate 48. The lock bar 82 may be operated with a link plate 84 and a handle 86. This locked position may be employed, for example, while the vehicle 12 is driving down the road, during maintenance, or any other time that non-rotation of the axles and stability of the vehicle is desired.

To unlock the suspension assembly 10, the lock pin 79 may be removed from the access holes 76, 78, and/or the lock bar 82 can be pivoted to disengage the distal end from the axle pivoting plate 48. With the removal of these mechanical locks that fix the position of the axles 36, 38 to the frame 18, the axles can pivot. As shown in FIG. 4E, the unlocked position may be employed, for example, while the vehicle 12 is being loaded or unloaded.

To lower the trailer 12, the operator will selectively use controls to extend the actuator 54. To raise the trailer 12, the operator will selectively use the same controls to retract the actuator 54.

It is contemplated that the trailer 12 can have a single-axle configuration, or can have any number of axles. A second embodiment of a trailer 12 having a single-axle configuration is depicted in FIGS. 7-10. The suspension assembly 10 for the single-axle configuration is generally similar to the dual-axle configuration in terms of structure and function, the difference being the lack of a second axle.

Figure 8:
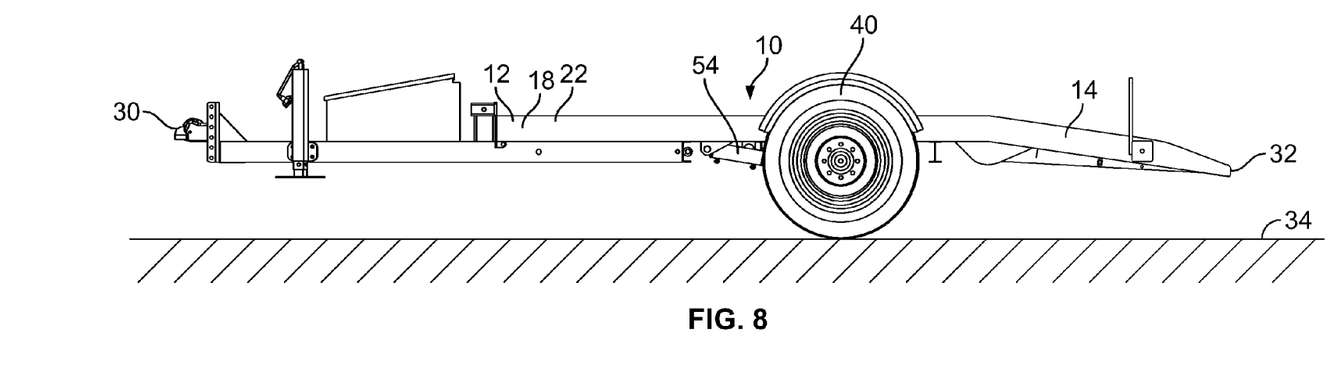
FIG. 8 is a side view of the trailer shown in FIG. 7 in a raised position.
Figure 9:
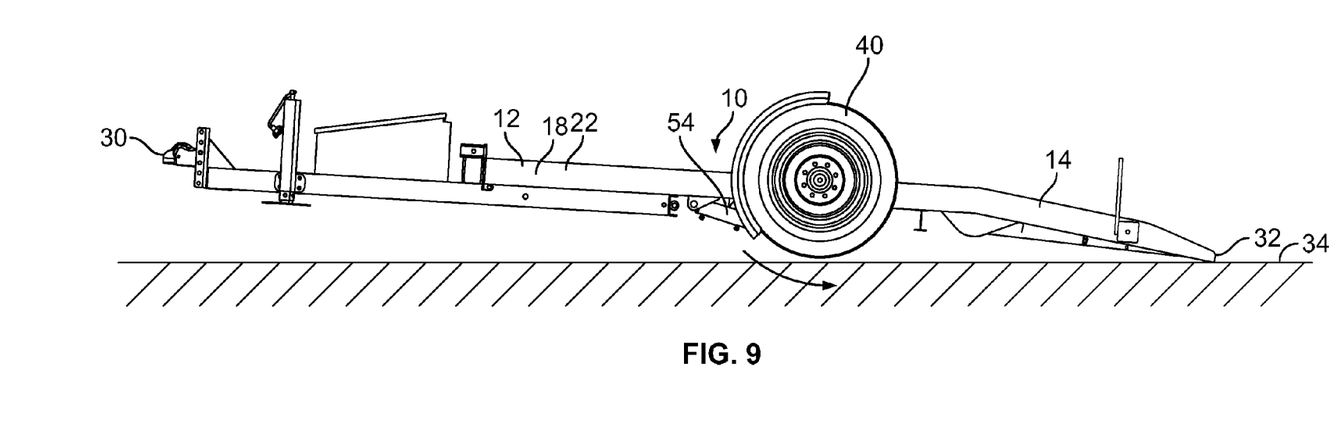
FIG. 9 is a side view of the trailer shown in FIG. 7 in a lowered position.
Figure 10:
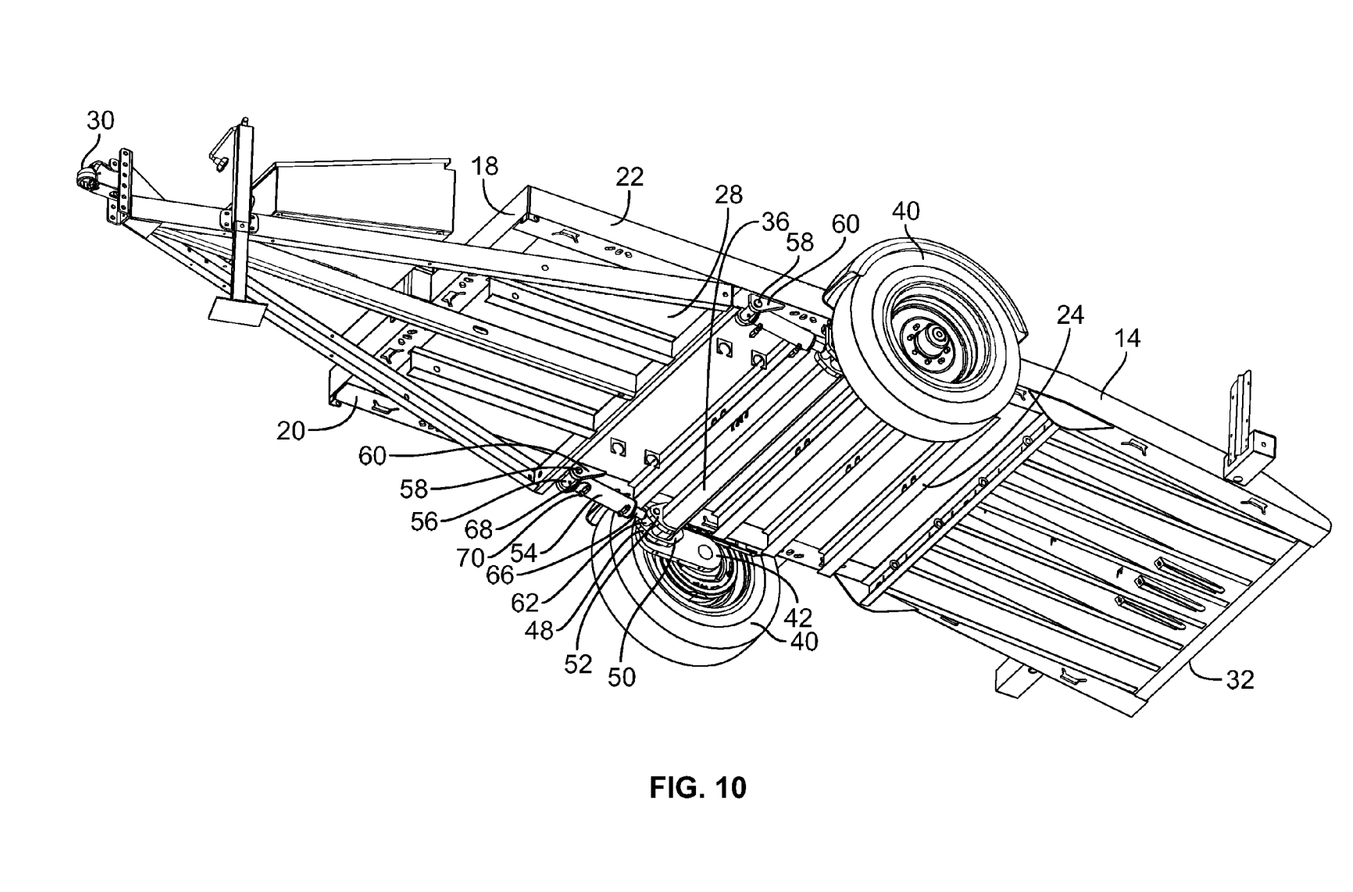
FIG. 10 is a perspective view of the trailer shown in FIG. 7 showing the underbody and suspension assembly.

The axle 36 is fixedly attached to the connection arm 42, which is pivotally connected to the center of the corresponding wheel 40. The axle mounting plate (not shown) is fixed to the frame 18 and pivotally connects the axle pivoting plate 48 to the frame at pivot point (not shown). The axle pivoting plate 48 is fixedly attached to the axle 36, and the sub-plate 50 is pinned to the pivot point. The actuator 54 is pivotally attached to the frame 18 with the pivot point 58 at the attachment plate 60. The actuator 54 is also pivotally attached to the axle pivoting plate 48 at pivot point 64. It is the rotation of the axle pivoting plate 48 that pivots the axle 36 about the center of the wheel 40 and with respect to the frame 18. When the actuator 54 is retracted, the trailer 12 will be in its raised position as shown in FIG. 8, and when the actuator 54 is extended, the trailer 12 will be in its lowered position as shown in FIG. 9.

While the suspension assembly 10, 10' was explained with reference to use on a trailer 12, it should be appreciated that the suspension system may also be used in other vehicle applications. While preferred embodiments of the disclosure have been herein illustrated and described, it is to be appreciated that certain changes, rearrangements and modifications may be made therein without departing from the scope of the disclosure as defined by the appended claims.

What is claimed is:

1. A suspension assembly for attachment to a trailer having a frame, a side rail, an axle and a wheel, the suspension assembly comprising:
   an axle pivoting plate pivotally mounted to the frame at a first pivot point and rotationally fixed to the axle;
   a connection arm having a first end onto which the wheel is rotatably mounted and a second end for receiving and rotationally fixing the axle to said connection arm;
   an actuator being movable between an extended and a retracted position, said actuator being pivotally connected to the frame at a second pivot point, and said actuator being pivotally connected to said axle pivoting plate at a third pivot point;
   wherein said first pivot point, said second pivot point, and said third pivot point are all located below the lower surface of the side rail;
   wherein when said actuator is extended, said axle pivoting plate pivots about said first pivot point causing the axle and connection arm to swing rearwardly and rotate, causing the wheel to move substantially vertically with respect to the frame to displace the trailer from a raised position to a lowered position.

2. The suspension assembly of claim 1 further comprising an axle mounting plate attached to the frame and having said first pivot point.

3. The suspension assembly of claim 1 further comprising a first access hole disposed through one of the frame and said axle mounting plate, and a second access hole disposed through said axle pivoting plate, wherein said first access hole and said second axle hole are configured to receive a lock pin to fix the relative rotation of the suspension assembly to the frame.

4. The suspension assembly of claim 1 further comprising a lock bar that is pivotally disposed on the frame, wherein said lock bar is configured to engage said axle pivoting plate to fix the relative rotation of the suspension assembly to the frame.

5. The suspension assembly of claim 1 wherein said axle pivoting plate further comprises a first sub-plate and a second sub-plate configured to receive said actuator therebetween.

6. The suspension assembly of claim 1 wherein when said actuator is retracted, a generally linear line is formed between the center of said wheel, said axle and said third pivot point, wherein said line is generally parallel with said frame.

7. The suspension assembly of claim 1 wherein said actuator has an in-line velocity fuse located at each port.

8. A suspension assembly for attachment to a frame of a trailer, the trailer having a side rail, an axle, a bed and an underbody opposite of the bed, the suspension assembly comprising:
   a wheel rotatively mounted on a connection arm, said connection arm radially extending from the center of said wheel and fixed to the axle, and being indirectly pivotally connected to the frame at a first pivot point, wherein said connection arm and said wheel are located on the outboard side of the frame;
   an axle pivoting plate fixed to the axle, said axle pivoting plate located on the inboard side of the frame and being pivotally connected to the frame at said first pivot point, said axle pivoting plate and said connection arm pivoting together about said first pivot point through their respective fixed relationships to the axle;
   an actuator being movable between an extended and a retracted position, said actuator being pivotally connected to the frame at a second pivot point, and said actuator being pivotally connected to said axle pivoting plate at a third pivot point, wherein said actuator is located on the inboard side of the frame;
   wherein when said actuator is extended, said axle pivoting plate pivots the axle about said first pivot point, and the suspension assembly located on the inboard side of the frame that pivots about the first pivot point only pivots within the underbody so as not to protrude above the bed;
   wherein said actuator has an in-line velocity fuse located at each port.

9. The suspension assembly of claim 8 wherein said first pivot point, said second pivot point and said third pivot point are all located below the lower surface of the side rail.

10. The suspension assembly of claim 8 further comprising an axle mounting plate attached to the frame and having said first pivot point.

11. The suspension assembly of claim 10 wherein said axle mounting plate extends downward from a lower surface of the frame.

12. The suspension assembly of claim 8 further comprising an attachment plate attached to the frame and having said second pivot point.

13. The suspension assembly of claim 8 wherein said axle pivoting plate further comprises a first sub-plate and a second sub-plate configured to receive said actuator therebetween.

14. The suspension assembly of claim 8 wherein when said actuator is retracted, a generally linear line is formed between the center of said wheel, said axle and said third pivot point, wherein said line is generally parallel with said frame.

15. A suspension assembly for attachment to a frame of a trailer having a first axle and a second axle, comprising:

a first wheel associated with the first axle, said first wheel having a first axle pivoting plate that is fixed to the first axle and pivotally connected to a first primary pivot point;

a second wheel associated with the second axle, said second wheel having a second axle pivoting plate that is fixed to the second axle and pivotally connected to a second primary pivot point;

a first actuator being movable between an extended and a retracted position, said first actuator being pivotally connected to the frame at a first secondary pivot point, and said first actuator being pivotally connected to said first axle pivoting plate at a first tertiary pivot point;

a second actuator being moveable between an extended and a retracted position, said second actuator being pivotally connected to the frame at a second secondary pivot point, and said second actuator being pivotally connected to said second axle pivoting plate at a second tertiary pivot point;

wherein when said first actuator is extended, said first axle pivoting plate pivots the first axle about said first primary pivot point, and pivots the first axle about the center of said first wheel to displace the trailer from a raised to a lowered position; and wherein when said second actuator is extended, said second axle pivoting plate pivots the second axle about said second primary pivot point, and pivots the second axle about the center of said second wheel to displace the trailer from a raised to a lowered position.

16. The suspension assembly of claim 15 wherein the first axle and the second axle are pivoted generally simultaneously over the same arc length about the center of said first wheel and said second wheel, respectively.

17. The suspension assembly of claim 15 wherein said first wheel and said second wheel contact the ground in the lowered position.

18. The suspension assembly of claim 15 wherein when said first actuator is retracted, said first axle pivoting plate pivots the first axle about said first primary pivot point, and pivots the first axle about the center of said first wheel to displace the trailer to a raised position; and wherein when said second actuator is retracted, said second axle pivoting plate pivots the second axle about said second primary pivot point, and pivots the second axle about the center of said second wheel to displace the trailer to a raised position.

19. The suspension assembly of claim 18 wherein only said second wheel contacts the ground when the trailer is in the lowered position.

* * * * *